T. D. HARVEY.
END GATE FASTENER.
APPLICATION FILED SEPT. 2, 1913.

1,128,870.

Patented Feb. 16, 1915.

WITNESSES
L. H. Schmidt
C. E. Trainor

INVENTOR
THOMAS D. HARVEY,
BY Munn & Co.
ATTORNEYS

THE NORRIS PETERS CO., PHOTO-LITHO., WASHINGTON, D. C.

UNITED STATES PATENT OFFICE.

THOMAS DAVID HARVEY, OF NEWARK, TEXAS.

END-GATE FASTENER.

1,128,870. Specification of Letters Patent. Patented Feb. 16, 1915.

Application filed September 2, 1913. Serial No. 787,635.

*To all whom it may concern:*

Be it known that I, THOMAS D. HARVEY, a citizen of the United States, and a resident of Newark, in the county of Wise and State of Texas, have invented a new and useful Improvement in End-Gate Fasteners, of which the following is a specification.

My invention is an improvement in end gate fasteners for wagons and like vehicles, and has for its object to provide a fastener of the character specified, simple in construction and operation, but permitting a firm lock when locked, and which may be readily and quickly disengaged when desired, and wherein the fastener consists of two sections, mounted for sliding movement longitudinally of each other, and having means for engagement to hold them in clamped position.

Figure 1:
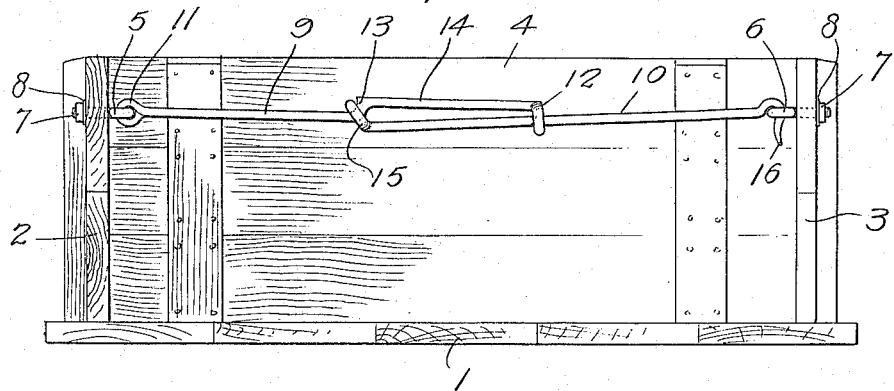
Figure 2:
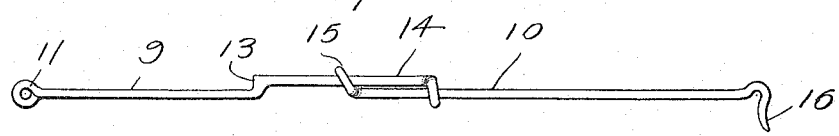
Figure 3:
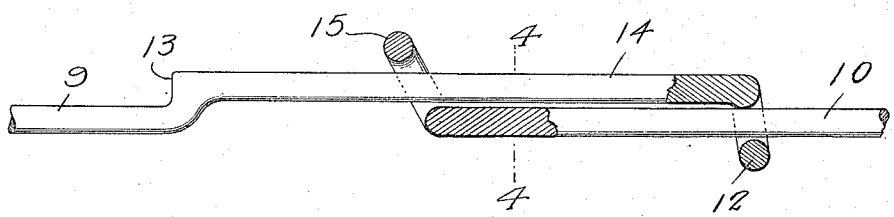
Figure 4:
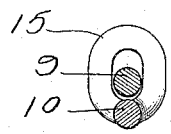

In the drawings: Figure 1 is a rear end view of a wagon body provided with the improved fastener, Fig. 2 is a front view of the sections of the fastener detached, Fig. 3 is an enlarged detail of the meeting ends of the sections of the fastener, with parts in section, and Fig. 4 is a section on the line 4—4 of Fig. 3.

The present embodiment of the invention is shown in connection with the body or bed of a wagon, the said body or bed consisting of the bottom 1, sides 2 and 3, and the end gate 4 is arranged on the bottom between the sides. Each of the sides of the body is provided with a transverse opening on the outer side of the end gate, and slightly below the upper edge of the said side, and eye bolts 5 and 6 are connected with the openings of the respective sides 2 and 3. The eye bolts are passed from the inner sides of the said sides 2 and 3 of the body, and outside of each of the sides 2 and 3 each eye bolt is engaged by a nut 7, a washer 8 being preferably arranged between each nut and the adjacent face of the adjacent side of the wagon. The fastener proper is sectional each section consisting of a rod, 9 and 10 respectively. The rod 9 is provided at its outer end with an eye 11, and the said eye engages the eye bolt 6. The inner end of the rod or section 9 is also provided with an eye 12, and the respective ends of the rod 9 are offset laterally from each other as shown to form a stop or shoulder 13 intermediate the ends of the said rod. The plane of the eye 12 is at approximately a right angle with respect to the rod, and the shoulder 13 is also at approximately a right angle to the rod. The offset portion 14 of the rod 9, that is that portion of the said rod between the shoulder 13 and the eye 12, is offset from the body of the rod, a distance corresponding approximately to the diameter of the rod, and the rod 10 is passed through the eye 12, and is provided with an eye 15 at its inner end which engages the offset portion 14 of the rod 9. The section or rod 10 is also provided with a hook 16 at its outer end, the said hook being adapted to engage the eye bolt 6.

It will be noted that the plane of the eye 15 is not at right angles to the rod 10, but is inclined at an obtuse angle with respect to the said rod. The stop or shoulder 13 is adapted to be engaged by the eye 15 of the rod 10, to prevent movement of the rods or sections of the fastener away from each other. The engagement of the eyes 12 and 15 with each other would prevent disengagement of the sections from each other.

In operation, the sections of the fastener are arranged as shown in Fig. 1, the rod 9 being permanently connected to the eye bolt 5, while the rod 10 is detachably connected with the eye bolt 6. With the parts in the position of Fig. 1, when it is desired to remove the end gate 4, the eye 15 is disengaged from the stop 13, by pushing the said eye upwardly. As soon as the disengagement occurs, the sides 2 and 3 will move outward slightly away from each other, thus releasing the end gate. If it is desired to load or unload the body through the end gate the hook 16 may be disengaged from the eye bolt 6 when the fastener may be swung to one side out of the way of the loading or unloading. After the end gate has been replaced, the hook 16 is engaged with the eye bolt 6, and the sides 2 and 3 are pressed together. The eyes 12 and 15 will slide on the rods 10 and 9 respectively until the rod 15 engages a stop 13, and the sections of the fastener will be locked from outward movement away from each other.

The improved fastener is cheaply constructed, may be applied to existing wagons without material change, and when once attached the fastener is always connected with the wagon, and cannot become lost or mislaid. While simple in construction and operation, the fastener is efficient, holding tightly the end gate in place, and the sections cannot easily become accidentally released. The curve on the bill of the hook 16 would prevent release of the hook unless the ring 15 were disengaged from the shoulder 13. To release the ring from the shoulder, it is necessary to draw the sections together, that is, to move them longitudinally to permit the ring to disengage the shoulder. Since all of the stress tends to move the sections away from each other, accidental release is prevented. There are no complicated parts to get out of order, and the device as a whole may be constructed at a very low cost.

I claim:—

A fastener for the end gates of wagons, consisting of a sectional rod, each section having an eye at one end through which the other section passes, one of the sections having an eye at its outer end and the other having a hook at its outer end, and one of the said sections having a stop intermediate its ends for engagement by the eye at the inner end of the other section.

THOMAS DAVID HARVEY.

Witnesses:
J. L. WREN,
R. J. HELTON.

Copies of this patent may be obtained for five cents each, by addressing the "Commissioner of Patents, Washington, D. C."